(12) United States Patent  
Todokoro

(10) Patent No.: US 10,656,550 B2  
(45) Date of Patent: May 19, 2020

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Ryotaro Todokoro, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/167,629

(22) Filed: Oct. 23, 2018

(65) Prior Publication Data

US 2019/0129325 A1 May 2, 2019

(30) Foreign Application Priority Data

Oct. 27, 2017 (JP) .................................. 2017-208340

(51) Int. Cl.
*G03G 15/043* (2006.01)
*G02B 26/12* (2006.01)
*G03G 15/00* (2006.01)

(52) U.S. Cl.
CPC ......... *G03G 15/043* (2013.01); *G02B 26/122* (2013.01); *G02B 26/127* (2013.01); *G03G 15/55* (2013.01)

(58) Field of Classification Search
CPC ............................ G03G 15/043; G02B 26/127
See application file for complete search history.

(56) References Cited

U.S. PATENT DOCUMENTS 9,199,480 B2* 12/2015 Yoshida ............. G03G 15/0435

FOREIGN PATENT DOCUMENTS

JP            04-334463        11/1992

* cited by examiner

*Primary Examiner* — Walter L Lindsay, Jr.
*Assistant Examiner* — Arlene Heredia
(74) *Attorney, Agent, or Firm* — Wenderoth, Lind & Ponack, L.L.P.

(57) ABSTRACT

In an optical scanning device, a light source includes a first light emitting point of an amount of light corresponding to a first mode and a second light emitting point of an amount of light corresponding to a second mode, and a control unit uses light beams emitted from a light emitting point of an amount of light corresponding to a mode set by a setting unit when the writing of image data is performed and uses light beams emitted from one prescribed light emitting point as light beams for synchronization detection, regardless of the mode set by the setting unit, when synchronization detection is performed before the writing of the image data is started.

1 Claim, 10 Drawing Sheets

LD1　　　　　　　LD2
(for low resolution)　(for high resolution)

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2017-208340 filed on Oct. 27, 2017, the entire contents of which are incorporated herein by reference.

BACKGROUND

The technology of the present disclosure relates to an optical scanning device and an image forming apparatus including the same.

In the related art, there has been known an optical scanning device mounted in an electrophotographic image forming apparatus. The optical scanning device emits light beams corresponding to image data at a predetermined writing timing, thereby exposing a photosensitive drum.

The optical scanning device includes a light source, a rotating polygon mirror that deflects light beams emitted from the light source and converts the light beams into scanning light, an image forming lens that allows an image of the scanning light from the rotating polygon mirror to be formed on a photosensitive drum, and a synchronization detection sensor that outputs a signal serving as a reference of a writing timing of image data. The synchronization detection sensor is provided out of an effective scanning region (out of an image formation region) of the light beams.

The synchronization detection sensor outputs a synchronization signal to a control unit when the amount of the light beams received from the light source is equal to or more than a prescribed threshold value. The control unit controls the writing timing of the image data to the photosensitive drum based on a reception timing of the synchronization signal.

In the optical scanning device, there is a case where a setting unit is provided to switch and set a low resolution mode and a high resolution mode. When the high resolution mode is set, the pixel density of an image in a vertical direction is increased by increasing a rotation speed of the rotating polygon mirror. Even when the resolution becomes high and the pixel density in the vertical direction is increased, since a beam diameter of light beams on a drum surface is constant, image failure such as character blurring may occur. In this regard, there has been proposed a technology for preventing the occurrence of image failure by reducing the amount (laser power) of light beams.

SUMMARY

An optical scanning device according to one aspect of the present disclosure includes a light source, an optical deflector, a synchronization detection sensor, a setting unit, and a control unit. The optical deflector deflects light beams emitted from the light source. The synchronization detection sensor detects the light beams, which are scanned in a main scanning direction by the optical deflector, out of an image formation region of a surface to be scanned. The setting unit switches and sets a first mode in which the amount of light of the light source is at a predetermined level and the second mode in which the amount of light of the light source is at a level lower than the predetermined level. The control unit receives a signal from the synchronization detection sensor, decides a writing start timing of image data, and controls the light source according to a mode set by the setting unit, thereby performing a writing process of the image data.

Furthermore, the light source includes a first light emitting point of an amount of light corresponding to the first mode and a second light emitting point of an amount of light corresponding to the second mode. The control unit is configured to use light beams emitted from a light emitting point of an amount of light corresponding to the mode of the first light emitting point or the second light emitting point, set by the setting unit when the writing of the image data is performed, and to use light beams emitted from prescribed one of the first light emitting point and the second light emitting point as light beams for synchronization detection, regardless of the mode set by the setting unit, when synchronization detection is performed before the writing of the image data is started.

An image forming apparatus according to another aspect of the present disclosure includes the aforementioned optical scanning device.

DETAILED DESCRIPTION

Hereinafter, an example of an embodiment will be described in detail on the basis of the drawings. It is noted that the technology of the present disclosure is not limited to the following embodiments.

Embodiment

Figure 1:
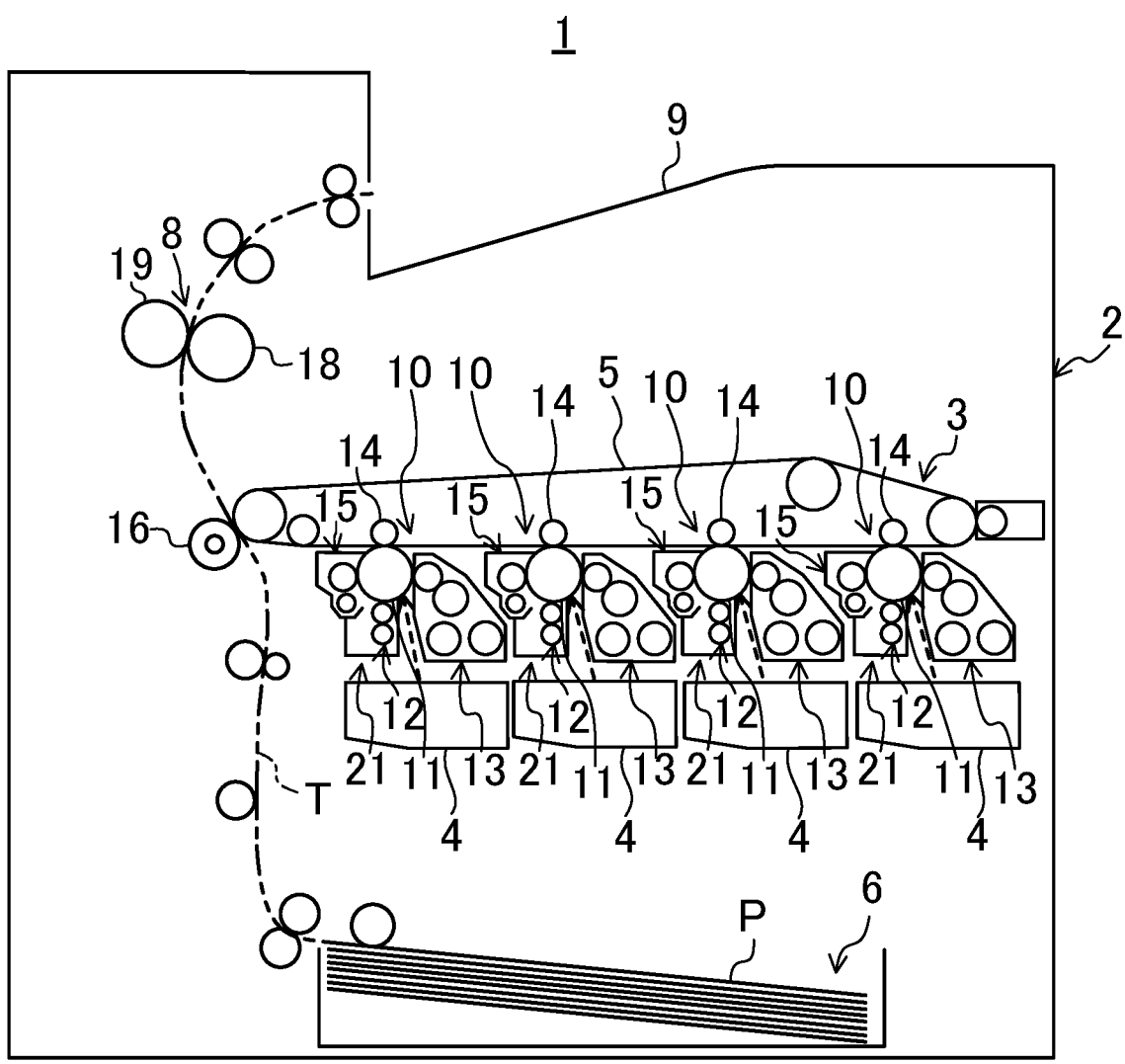
FIG. 1 is a schematic view illustrating an internal structure of an image forming apparatus in an embodiment.

FIG. 1 illustrates a schematic configuration view of an image forming apparatus 1 in the present embodiment. The image forming apparatus 1 is a tandem type color printer and has an image forming unit 3 in a box-like casing 2. The image forming unit 3 transfers an image to a sheet P and forms the image on the sheet P on the basis of image data transmitted from an external device such as a computer subjected to network connection and the like. Below the image forming unit 3, four optical scanning devices 4 are disposed to emit laser beams, and above the image forming unit 3, a transfer belt 5 is disposed. Below the optical scanning devices 4, a sheet storage unit 6 is disposed to store the sheet P. At a left upper side of the transfer belt 5, a fixing unit 8 is disposed to perform a fixing process on the image transferred to and formed on the sheet P. At an upper part of the casing 2, a sheet discharge unit 9 is formed to discharge the sheet P subjected to the fixing process in the fixing unit 8. The image forming apparatus 1 is provided therein with a sheet conveyance path L extending toward the sheet discharge unit 9 from the sheet storage unit 6.

The image forming unit 3 includes four image forming units 10 disposed in a row along the transfer belt 5. Below each of the image forming units 10, the optical scanning device 4 is disposed. Each of the image forming units 10 has a photosensitive drum 11. Directly under each photosensitive drum 11 (a surface to be scanned), a charging device 12 is disposed, and at a right side of each photosensitive drum 11, a developing device 13 is disposed. Directly above each photosensitive drum 11, a primary transfer roller 14 is disposed, and at a left side of each photosensitive drum 11, a cleaning unit 15 is disposed to clean the peripheral surface of the photosensitive drum 11.

The peripheral surface of each photosensitive drum 11 is constantly charged by the charging device 12, and laser beams corresponding to each color based on image data inputted from the computer and the like are irradiated to the charged peripheral surface of the photosensitive drum 11 from the optical scanning devices 4. As a consequence, an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

At the left side of the transfer belt 5, a secondary transfer roller 16 is disposed. The secondary transfer roller 16 is disposed in the state of abutting the transfer belt 5. The secondary transfer roller 16 interposes the sheet P conveyed from the sheet storage unit 6 along the sheet conveyance path L between the secondary transfer roller 16 and the transfer belt 5. A transfer bias is applied to the secondary transfer roller 16, so that the toner images on the transfer belt 5 are transferred to the sheet P by the applied transfer bias.

The fixing unit 8 includes a heating roller 18 and a pressure roller 19, wherein the sheet P is interposed by the heating roller 18 and the pressure roller 19 so as to be pressurized and heated. By so doing, the fixing unit 8 fixes the toner images, which have been transferred to the sheet P, to the sheet P. The sheet P subjected to the fixing process is discharged to the sheet discharge unit 9.

Figure 2:
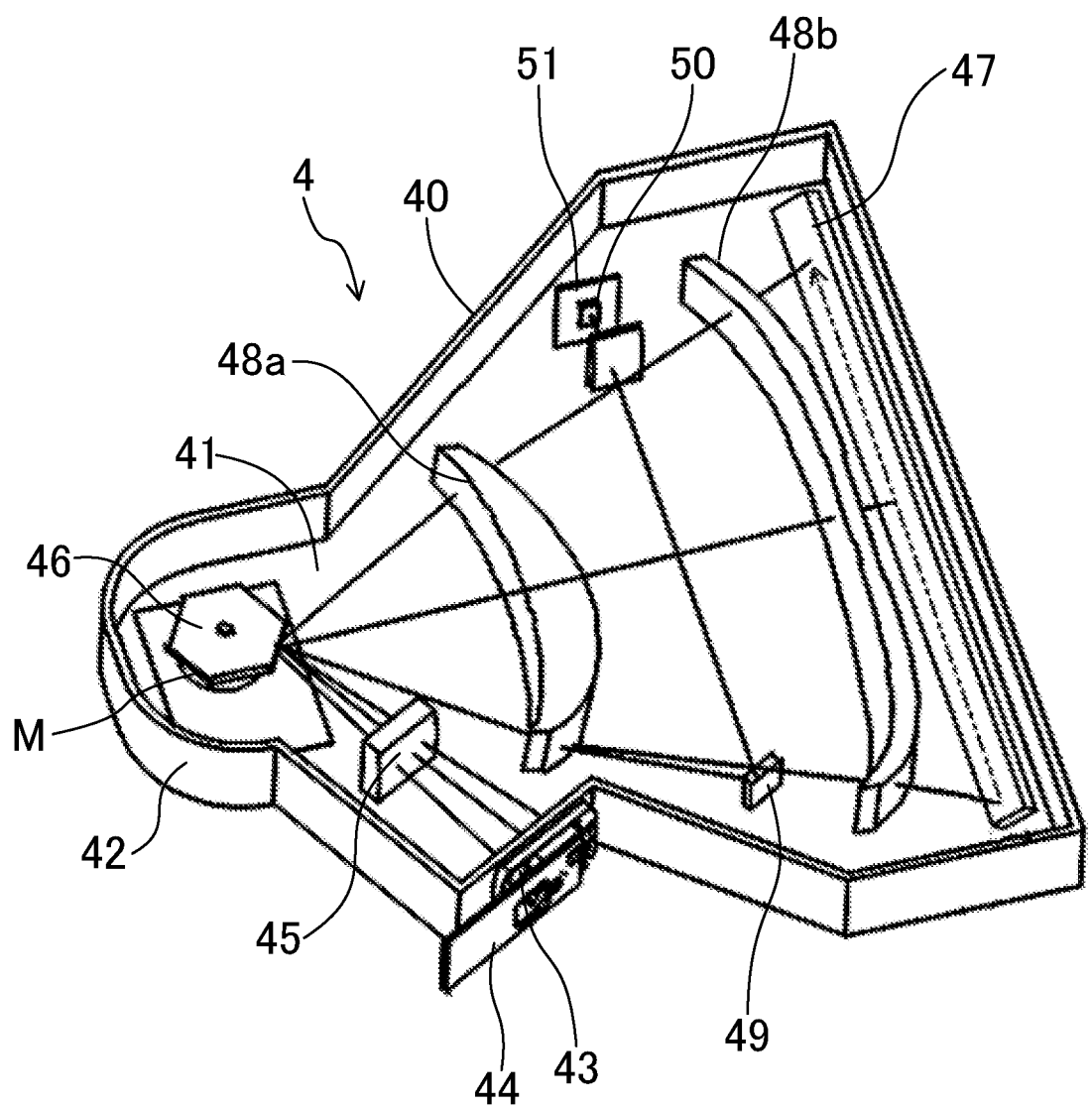
FIG. 2 is a perspective view illustrating a state in which a lid member has been removed from an optical scanning device.

Next, with reference to FIG. 2, each optical scanning device 4 will be described in detail. Since the configurations of the optical scanning devices 4 are identical to one another, only one of the optical scanning devices 4 will be described and the other optical scanning devices 4 will not be described.

The optical scanning device 4 has a sealed housing 40. The housing 40 has a bottom wall part 41, a side wall part 42 upright from a peripheral edge of the bottom wall part 41, and a lid (not illustrated).

Figure 3:
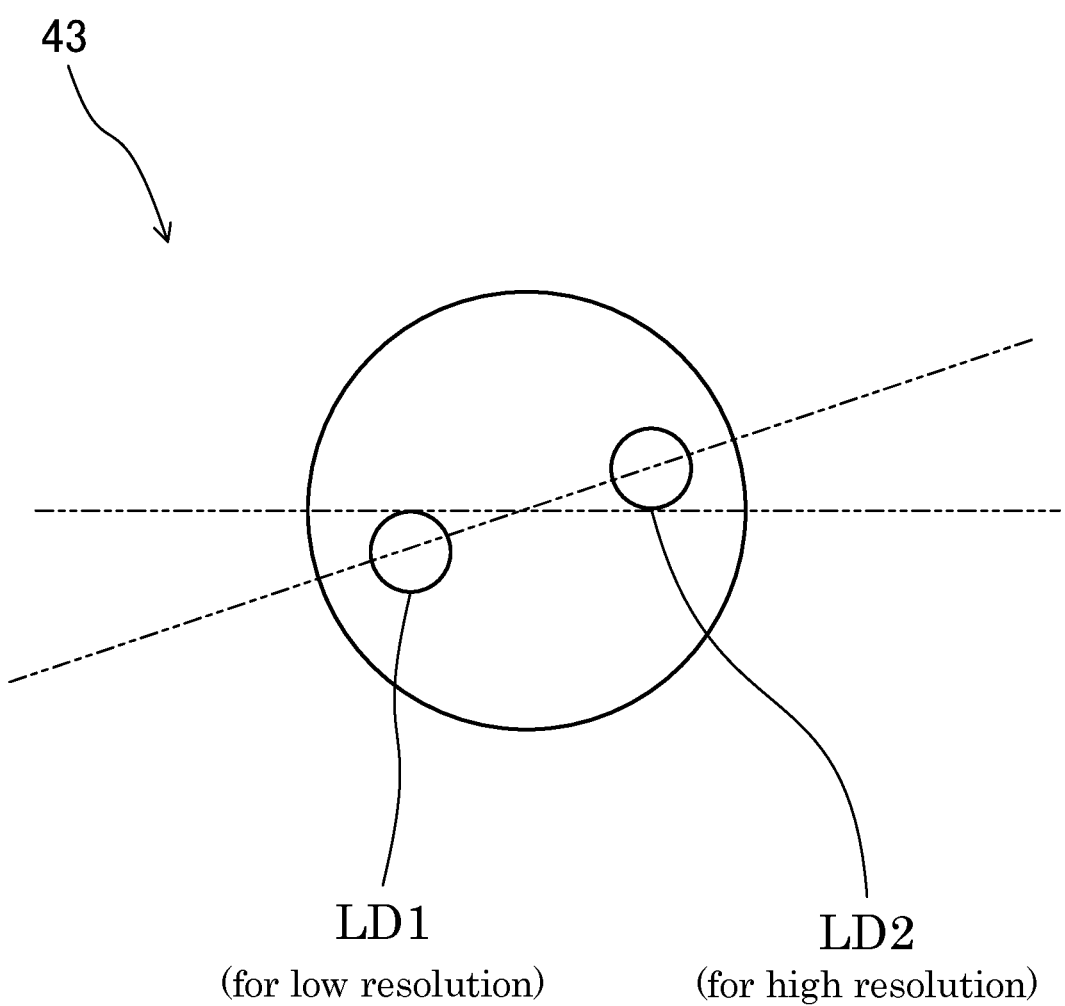
FIG. 3 is a schematic view when a light source of an optical scanning device is viewed from an axial base end side.

The side wall part 42 of the housing 40, for example, is provided with a light source 43 including a laser diode (LD) and the like. The light source 43 is installed at a board 44 mounted on the outside surface of the side wall part 42. The light source 43 is a multibeam light source that emits a plurality of light beams, and has a first light emitting point LD1 and a second light emitting point LD2 as illustrated in FIG. 3.

The first light emitting point LD1 and the second light emitting point LD2 are disposed spaced apart from each other in a direction obliquely crossing a rotation direction (a right and left direction of FIG. 3) of a polygon mirror 46 when viewed from a base end side (an opposite side of a light emitting side) of the light source 43.

The first light emitting point LD1 is used when image data is written in the low resolution mode. The second light emitting point LD2 is used when image data is written in the high resolution mode. The amounts of light of the first light emitting point LD1 and the second light emitting point LD2 are controlled by a control unit 100 to be described later.

The amount of light of the first light emitting point LD1 used in the low resolution mode (corresponding to a first mode) is at a predetermined level, and the amount of light of the second light emitting point LD2 used in the high resolution mode (corresponding to a second mode) is at a level smaller than the predetermined level. That is, laser driving power of the second light emitting point LD2 is smaller than that of the first light emitting point LD1.

The first light emitting point LD1, at which the amount of light is larger than that of the second light emitting point LD2, also severs as a light emitting point for synchronization detection which is used in a synchronization detection process to be described later. In the present embodiment, the light emitting point for synchronization detection is decided as the first light emitting point LD1 in advance; however, the technology of the present disclosure is not limited thereto and the second light emitting point LD2 may be decided as the light emitting point for synchronization detection.

In the housing 40, a collimator lens (not illustrated), a cylindrical lens 45, and the polygon mirror (a rotating polygon mirror) 46 are disposed on a straight line along an emission direction of light beams emitted from the light source 43. The polygon mirror 46 is rotationally driven by a polygon motor M fixed to the bottom wall part 41 of the housing 40. At a lateral side of the polygon mirror 46, a first image forming lens 48a and a second image forming lens 48b are disposed spaced apart from each other in a radial direction. The first image forming lens 48a and the second image forming lens 48b, for example, are fθ lenses. At a lateral side of the second image forming lens 48b, a return mirror 47 is disposed.

The polygon mirror 46 is a polygonal rotation mirror having a plurality of reflecting surfaces on the peripheral surface thereof. The polygon mirror 46 reflects (deflects) the light beams B1 and B2 respectively emitted from the first and second light emitting points LD1, LD2 and allows the light beams to be scanned in a main scanning direction. The first image forming lens 48a and the second image forming lens 48b perform equal speed conversion for the light beams B1 and B2 deflected and scanned by the polygon mirror 46. The return mirror 47 reflects the light beams B1 and B2 having passed through the second image forming lens 48b and leads the reflected light beams to the peripheral surface of the photosensitive drum 11.

The housing 40 is further provided with a synchronization detection mirror 49, a synchronization detection sensor 50, and a sensor board 51 mounted with the synchronization detection sensor 50.

The synchronization detection mirror 49 reflects the light beams B1 and B2 (see FIG. 4), which have been deflected by the polygon mirror 46 and have traveled along an optical path out of an effective scanning region (an image formation region in which image data is actually written), toward the synchronization detection sensor 50. The light beams B1 and B2 deflected by the polygon mirror 46 and traveled along an optical path in the effective scanning range scan and expose the peripheral surface of the photosensitive drum 11 in an axial direction (the main scanning direction).

Figure 4:
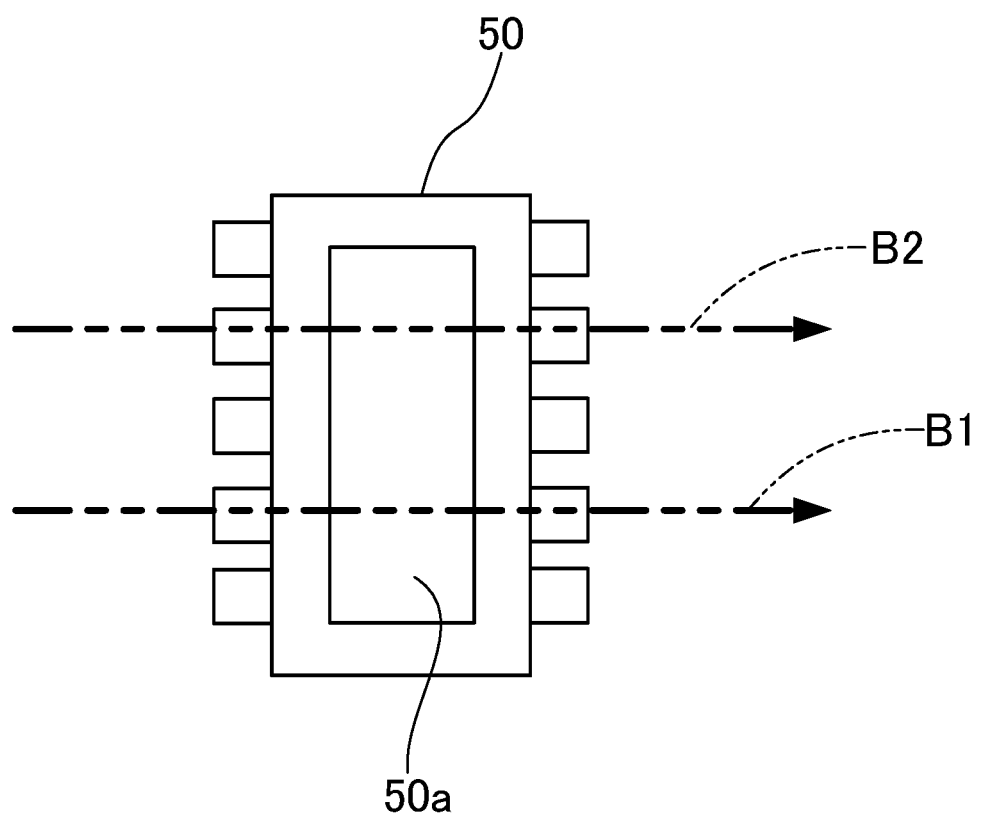
FIG. 4 is a plan view when a synchronization detection sensor is viewed from a detection surface side.

The synchronization detection sensor 50 is mounted on the sensor board 51 vertically fixed to the bottom wall part 41 of the housing 40. FIG. 4 is an enlarged plan view of the synchronization detection sensor 50. The synchronization detection sensor 50, for example, is configured by a photodiode, a phototransistor, a photo IC and the like. The synchronization detection sensor 50 outputs detection signals of the light beams B1 and B2 when the light beams B1 and B2 have passed through a detection surface 50a. The detection signals outputted from the synchronization detection sensor 50 are transmitted to the control unit 100 to be described later.

Figure 5:
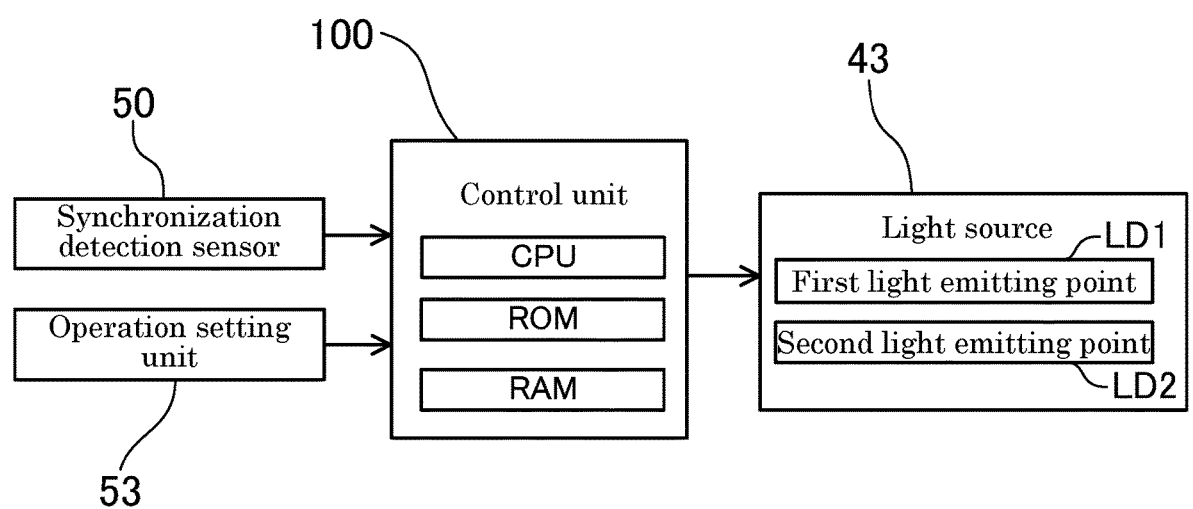
FIG. 5 is a block diagram illustrating a part of a control system of an optical scanning device.

As illustrated in FIG. 5, the control unit 100 includes a microcomputer having a CPU, a ROM, and a RAM. The control unit 100 is connected to the synchronization detection sensor 50, an operation setting unit 53 (corresponding to a setting unit), the light source 43, and the polygon motor M such that signals can be received and transmitted.

The operation setting unit 53, for example, is configured by a touch type liquid crystal panel and the like. The operation setting unit 53 displays a setting screen for setting a resolution level of a printed image on a touch panel. When a user operates the setting screen, a print mode of the image forming apparatus 1 can be switched between the low resolution mode and the high resolution mode. In the low resolution mode, image data of a predetermined resolution (for example, 600 dpi) is printed, and in the high resolution mode, image data of a resolution (for example, 1,200 dpi) higher than the predetermined resolution is printed.

The control unit 100 performs the synchronization detection process for deciding the writing start timing of image data based on a synchronization signal outputted from the synchronization detection sensor 50. Furthermore, the control unit 100 controls the light emitting points LD1, LD2 of the light source 43 and the polygon motor M, thereby performing the writing of image data to the surface of the photosensitive drum 11 at a resolution corresponding to a resolution level set by the operation setting unit 53.

Figure 6:
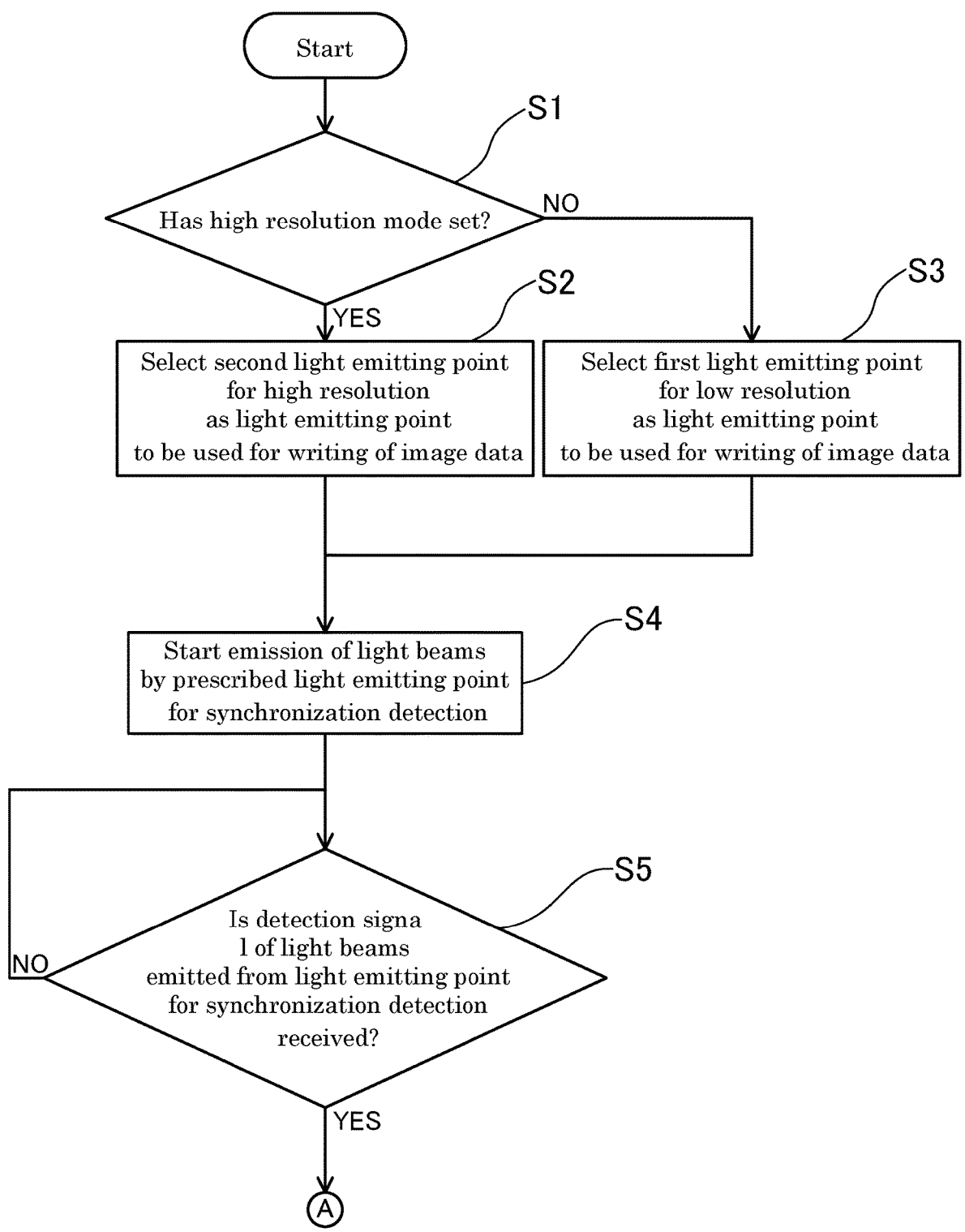
FIG. 6 is a flowchart illustrating a first half of synchronization detection control and image data writing control performed by a control unit.
Figure 7:
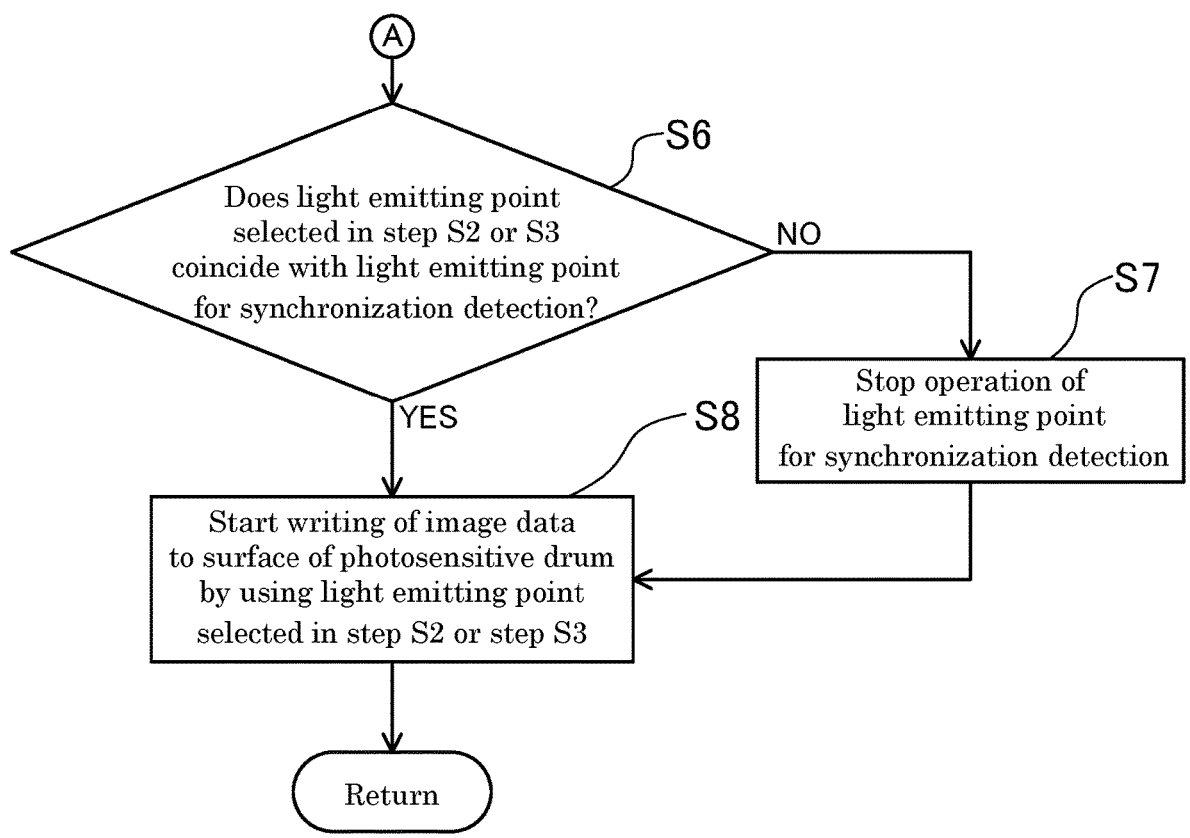
FIG. 7 is a flowchart illustrating a second half of synchronization detection control and image data writing control performed by a control unit.

With reference to FIG. 6 and FIG. 7, the synchronization detection process and the image data writing process performed by the control unit 100 will be described in detail.

In step S1, the control unit 100 determines whether a current print mode is the high resolution mode based on an operation signal from the operation setting unit 53. When this determination is NO, the control unit 100 proceeds to step S3, and when this determination is YES, the control unit 100 proceeds to step S2.

In step S2, the control unit 100 selects the second light emitting point LD2 for a high resolution as a light emitting point to be used for the writing of image data, and in step S3, the control unit 100 selects the first light emitting point LD1 for a low resolution as the light emitting point to be used for the writing of the image data.

In step S4 after the process of step S2 or step S3 is performed, the control unit 100 starts the emission of light beams by a prescribed light emitting point for synchronization detection (the first light emitting point LD1 in the example of the present embodiment).

In step S5, the control unit 100 determines whether the light beams emitted from the light emitting point for synchronization detection have been detected by the synchronization detection sensor 50 (that is, the synchronization signal from the synchronization detection sensor 50 has been received). When this determination is NO, the control unit 100 performs the process of step S5 again, and when this determination is YES, the control unit 100 proceeds to step S6 (see FIG. 7).

In step S6, the control unit 100 determines whether the light emitting point for the image data writing selected in step S2 or S3 coincides with the light emitting point for synchronization detection. When this determination is NO, the control unit 100 proceeds to step S7, and when this determination is YES, the control unit 100 proceeds to step S8.

In step S7, the control unit 100 stops the operation of the light emitting point for synchronization detection (the first light emitting point LD1) and proceeds to step S8.

In step S8, the control unit 100 starts the writing of the image data to the surface of the photosensitive drum 11 by using the light emitting point selected in step S2 or S3. In this case, when the high resolution mode has been set, the control unit 100 increases the rotation speed of the polygon motor M (that is, the polygon mirror 46) as compared with a case where the low resolution mode has been set. By so doing, the process of the present step S8 is ended and the procedure is returned.

As described above, according to the optical scanning devices 4 of the present embodiment, the light source 43 includes the first light emitting point LD1 corresponding to the low resolution mode and the second light emitting point LD2 corresponding to the high resolution mode. When the image data writing process is performed, the control unit 100 uses the light emitting points LD1, LD2 of the amounts of light corresponding to a resolution mode set by the operation setting unit 53 (step S2 and step S3). When the synchronization detection process is performed before the image data writing is started, the control unit 100 uses light beams, which are emitted from one prescribed light emitting point (the light emitting point for synchronization detection, and the light emitting points LD1 in the present embodiment), as light beams for synchronization detection (steps S4 and S5), regardless of the resolution mode set by the operation setting unit 53.

According to this, the image data writing is performed using the light emitting points LD1, LD2 of appropriate amounts of light corresponding to the resolution mode set by the operation setting unit 53. Consequently, for example, it is possible to prevent the occurrence of image failure such as character blurring in the high resolution mode. On the other hand, since the same light emitting point (the light emitting points LD1 in the present embodiment) is used as the light emitting point for synchronization detection to be used for the synchronization detection process regardless of the resolution mode set by the operation setting unit 53, the amount of light beams incident on the synchronization detection sensor 50 is always constantly maintained. Consequently, it is possible to avoid a problem that the amount of light beams incident on the synchronization detection sensor 50 becomes less than a detectable level set in advance and thus synchronization detection is not possible.

Figure 8:
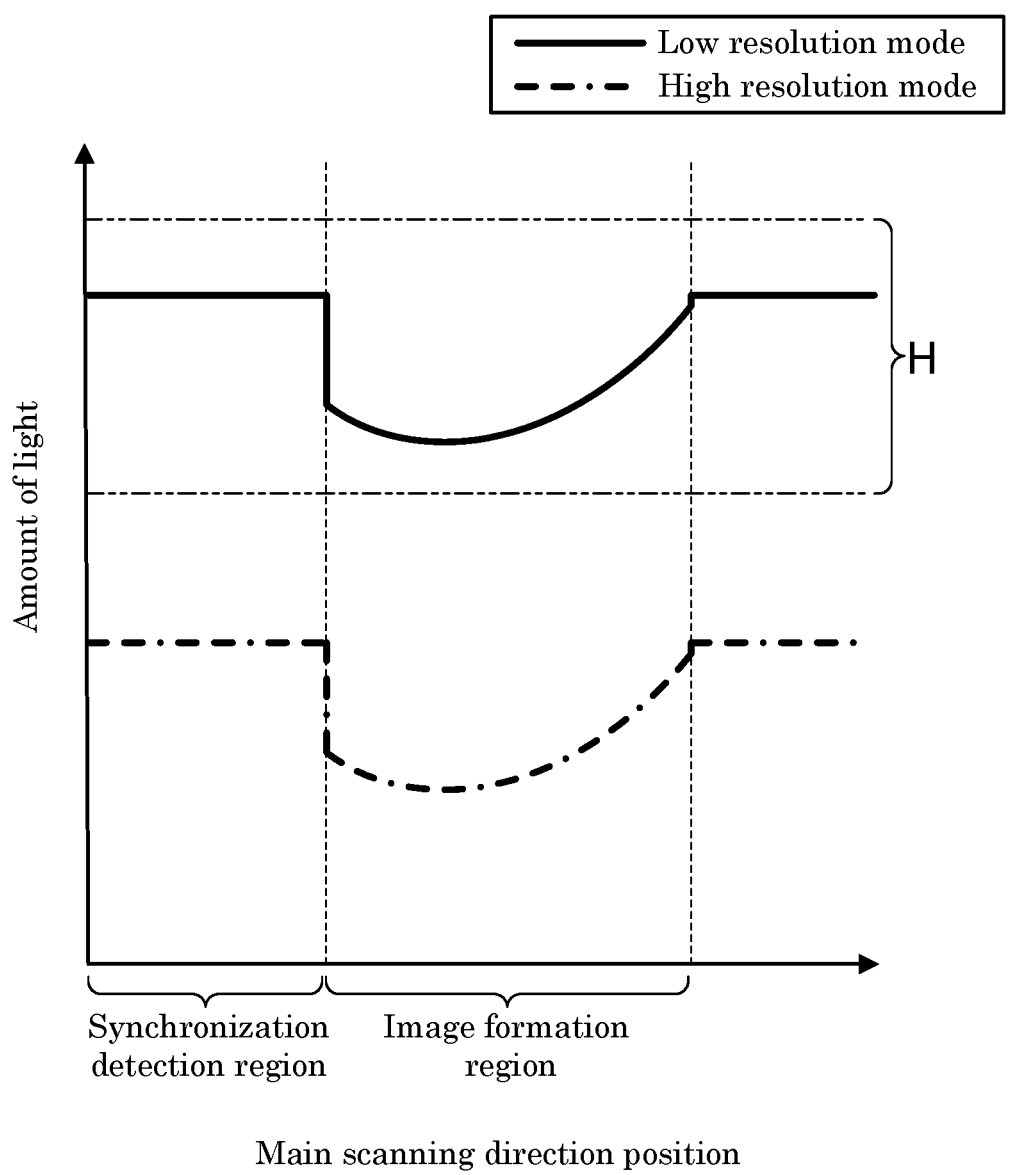
FIG. 8 is a graph illustrating a change in the output of light beams according to a change in the setting of a resolution level in an optical scanning device of a comparative example 1.

That is, as illustrated in the comparative example 1 of FIG. 8, in a case where the amount of light beams has changed in the effective scanning region (the image formation region) and the synchronization detection region in accordance with a change in the resolution level by using the light source including one light emitting point, when the high resolution mode has been set, there is a case where the amount of light beams incident on the synchronization detection sensor 50 becomes less than a detectable level H set in advance. In the example of FIG. 8, when the high resolution mode has been set, the light beams becomes less than the detectable level H in the synchronization detection region; however, it is considered that when the low resolution mode has been set, the light beams exceeds the detectable level of the synchronization detection sensor 50 in the synchronization detection region. In any case, since it is not possible to detect the light beams by the synchronization detection sensor 50, synchronization detection may not be possible.

In contrast, in the present embodiment, even though the resolution level is switched, a light emitting point to be used for synchronization detection is not switched. Thus, the amount of light beams incident on the synchronization detection sensor 50 is always constantly maintained. Consequently, there is no case where synchronization detection is not possible as with the comparative example 1.

Figure 9:
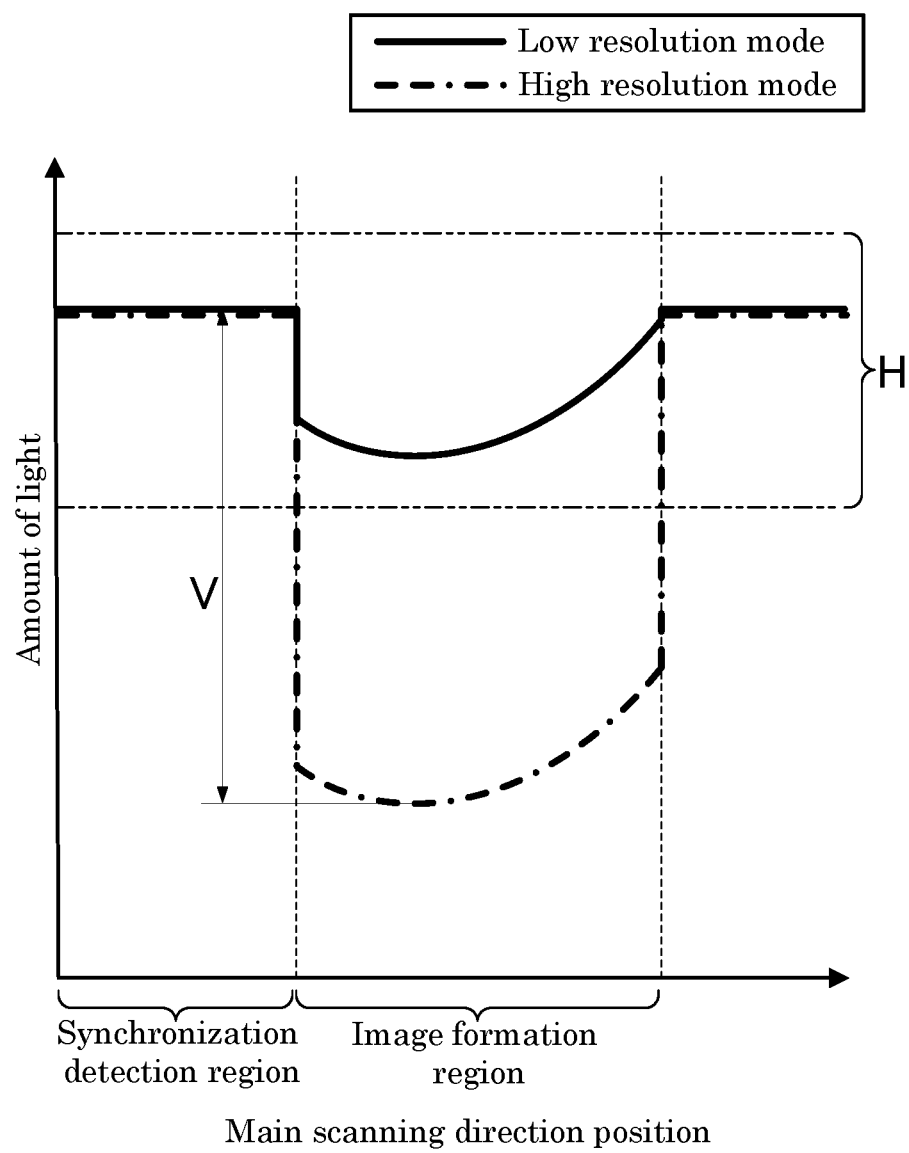
FIG. 9 is a graph illustrating a change in the output of light beams according to a change in the setting of a resolution level in an optical scanning device of a comparative example 2.

Furthermore, as illustrated in the comparative example 2 of FIG. 9, the amount of light beams is changed in the effective scanning region in accordance with a change in the resolution level by using one light emitting point, and it is considered to perform light source control such that the amount of light beams is constantly maintained in the synchronization detection region. However, in such a case, when a change amount V in the amount of light when the synchronization detection region is switched to the effective scanning region is too large (a change amount in the high resolution mode in the example of FIG. 9). As described above, when the change amount V in the amount of light is large, there is a problem that it is difficult to control the amount of light to a target amount of light and the precision of writing of an image is reduced in terms of characteristics of the control system.

In contrast, in the present embodiment, two light emitting points of the first light emitting point LD1 for the low resolution mode and the second light emitting point LD2 for the high resolution mode are provided, and only one light emitting point LD1 is used as the light emitting point for synchronization detection. Consequently, it is possible to suppress the change width of the amount of light as compared with the comparative example 2 in which resolution mode switching and synchronization detection are performed using only one light emitting point.

Other Embodiments

The aforementioned embodiment has described an example in which the first mode, in which the amount of light is at a predetermined level, is the low resolution mode and the second mode, in which the amount of light is at a level lower than the predetermined level, is the high resolution mode; however, the technology of the present disclosure is not limited thereto.

That is, the first mode may be a low speed print mode in which the speed of writing of image data to the surface of the photosensitive drum 11 by the optical deflector (the polygon mirror 46) is a predetermined speed, and the second mode may be a high speed print mode in which the speed of writing of image data to the surface of the photosensitive drum 11 by the optical deflector is faster than the predetermined speed.

Furthermore, the first mode may be a normal print mode in which the driving power of the light source 43 is predetermined power, and the second mode may be an economy print mode in which the driving power of the light source 43 is smaller than the predetermined power.

Figure 10:
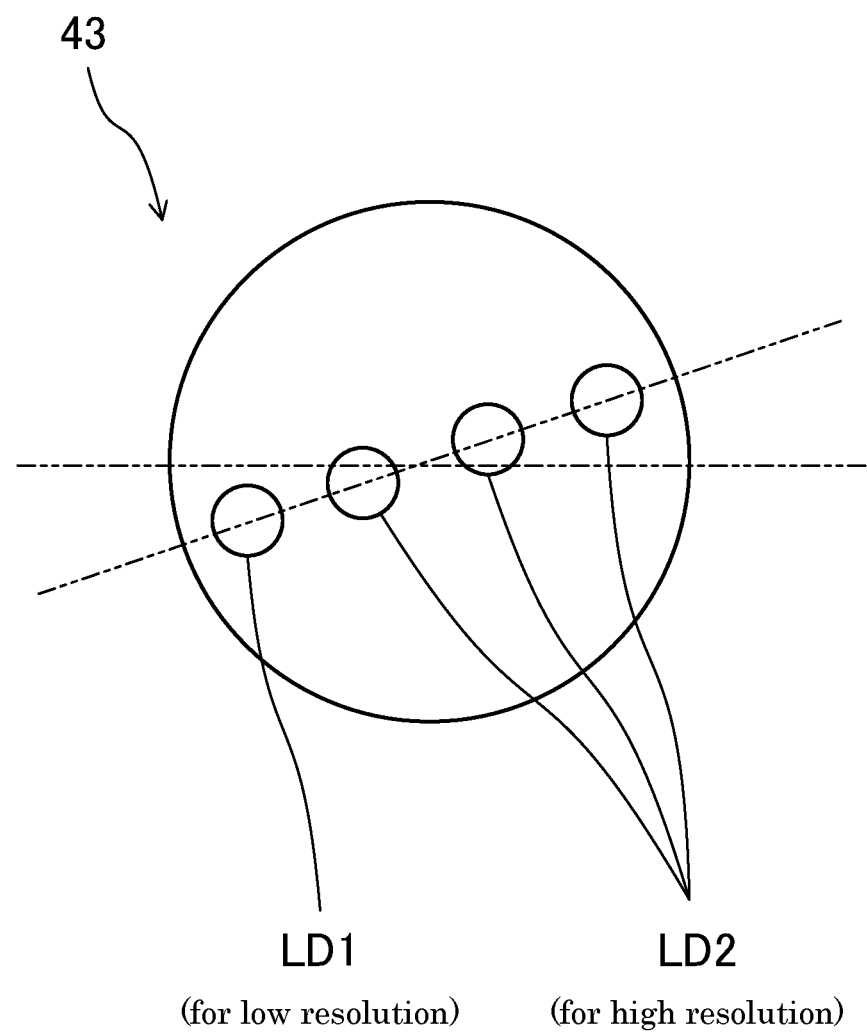
FIG. 10 is a view corresponding to FIG. 3, which illustrates another embodiment.

The aforementioned embodiment has described an example in which the light source 43 includes one first light emitting point LD1 and one second light emitting point LD2; however, the first light emitting point LD1 may be provided in a plural number and the second light emitting point LD2 may be provided in a plural number. FIG. 10 illustrates the light source 43 including one first light emitting point LD1 and three second light emitting points LD2 as an example.

What is claimed is:

1. An optical scanning device comprising:
   a light source;
   an optical deflector that deflects light beams emitted from the light source;
   a synchronization detection sensor that detects the light beams, which are scanned in a main scanning direction by the optical deflector, out of an image formation region of a surface to be scanned;
   a setting unit that switches and sets a first mode in which an amount of light of the light source is at a predetermined level and a second mode in which the amount of light of the light source is at a level lower than the predetermined level; and
   a control unit that receives a signal from the synchronization detection sensor, decides a writing start timing of image data, and controls the light source according to a mode set by the setting unit, thereby performing a writing process of the image data,
   wherein the light source includes a first light emitting point of an amount of light corresponding to the first mode and a second light emitting point of an amount of light corresponding to the second mode, and
   wherein the control unit is configured to use light beams emitted from a light emitting point of an amount of light corresponding to the mode set by the setting unit between the first light emitting point and the second light emitting point when the writing of the image data is performed, and to use light beams emitted from a prescribed one of the first light emitting point and the second light emitting point as light beams for synchronization detection, regardless of the mode set by the setting unit, when synchronization detection is performed before the writing of the image data is started,
   wherein the first mode is a low speed print mode in which a speed of the writing of the image data to the surface to be scanned by the optical deflector is a predetermined speed, and
   wherein the second mode is a high speed print mode in which the speed of the writing of the image data to the surface to be scanned by the optical deflector is faster than the predetermined speed.

* * * * *